United States Patent
Wasko et al.

(10) Patent No.: US 12,418,392 B2
(45) Date of Patent: Sep. 16, 2025

(54) PRECISE MULTICAST TIMESTAMPING

(71) Applicant: Mellanox Technologies, Ltd., Yokneam (IL)

(72) Inventors: Wojciech Wasko, Pomeranian (PL); Dotan David Levi, Kiryat Motzkin (IL); Natan Manevich, Migdal HaEmek (IL); Maciek Machnikowski, Reda (PL)

(73) Assignee: Mellanox Technologies, Ltd., Yokneam (IL)

( * ) Notice: Subject to any disclaimer, the term of this patent is extended or adjusted under 35 U.S.C. 154(b) by 553 days.

(21) Appl. No.: 17/942,899

(22) Filed: Sep. 12, 2022

(65) Prior Publication Data

US 2024/0089077 A1    Mar. 14, 2024

(51) Int. Cl.
*H04L 7/00* (2006.01)
*H04L 12/18* (2006.01)

(52) U.S. Cl.
CPC ........ *H04L 7/0091* (2013.01); *H04L 12/1881* (2013.01)

(58) Field of Classification Search
None
See application file for complete search history.

(56) References Cited

U.S. PATENT DOCUMENTS

| | | | | |
|---|---|---|---|---|
| 6,701,338 B2 * | 3/2004 | Narad | ................. | G06F 9/30038 709/223 |
| 6,859,841 B2 * | 2/2005 | Narad | ................. | G06F 9/3885 709/236 |
| 8,549,256 B2 * | 10/2013 | Narad | ................. | G06F 9/3885 712/3 |
| 9,294,386 B2 * | 3/2016 | Narad | ................. | G06F 9/30127 |
| 2004/0143655 A1 * | 7/2004 | Narad | ................. | G06F 9/30145 709/232 |
| 2004/0148382 A1 * | 7/2004 | Narad | ................. | H04L 49/9031 717/140 |
| 2004/0221088 A1 * | 11/2004 | Lisitsa | ............... | H04L 65/1101 710/316 |
| 2007/0169179 A1 * | 7/2007 | Narad | ................. | G06F 9/30127 712/3 |
| 2014/0140342 A1 * | 5/2014 | Narad | ................. | G06F 9/30094 709/200 |
| 2020/0313999 A1 * | 10/2020 | Lee | ................... | H04L 43/0847 |
| 2023/0156748 A1 * | 5/2023 | Li | ........................ | H04W 4/08 370/329 |
| 2024/0054081 A1 * | 2/2024 | Blixt | ................... | G06F 15/7867 |
| 2024/0089077 A1 * | 3/2024 | Wasko | ................. | H04J 3/0664 |

* cited by examiner

*Primary Examiner* — Faiyazkhan Ghafoerkhan
(74) *Attorney, Agent, or Firm* — Lowenstein Sandler LLP (57) ABSTRACT

A network interface device includes a local register and packet processing circuitry coupled to the local register. The packet processing circuitry is to: capture a network packet transmitted by a software application running on an integrated computing system; capture, at time of transmission of the network packet, a value of a physical clock as a receive timestamp for subscriber entities that are running on the integrated computing system; store the receive timestamp in the local register; associate the receive timestamp from the local register with a first packet copy of the network packet; insert the first packet copy to a first receive pipeline of a first subscriber entity; associate the receive timestamp from the local register with a second packet copy of the network packet; and insert the second packet copy to a second receive pipeline of a second subscriber entity.

22 Claims, 4 Drawing Sheets

PRECISE MULTICAST TIMESTAMPING

TECHNICAL FIELD

At least one embodiment pertains to processing resources used to perform and facilitate network communication. For example, at least one embodiment pertains to technology for precise multicast timestamping of a network interface device.

BACKGROUND

Many computing systems or devices have a network adapter (e.g., a network interface card (NIC) or other network interface device) used for communicating over networks, to include the Internet. Many network adapters perform multicasting, which is a single source sending to multiple recipients on a network when the receiver broadcasts a signal for acceptance, also referred to as subscribing or joining a multicast. Multicasting has its own Class D Internet Protocol (IP) addressing scheme, controlled and assigned by the Assigned Numbers Authority (IANA). Other synchronization protocols also involve multicasting, such as those of layer-2 Ethernet (or the Data Link Layer) and InfiniBand™ of the InfiniBand Trade Association. Because of packet synchronization protocols associated with these (and optionally other) multicasting technologies, timing of when the packet was sent is ideally, and precisely, tracked and provided to each subscriber of the multicast transmission. Using the original transmission timestamp is inaccurate for subscribers that receive subsequently-generated packet copies, leading to apparent synchronization quality degradation due to timing offsets.

BRIEF DESCRIPTION OF DRAWINGS

Various embodiments in accordance with the present disclosure will be described with reference to the drawings, in which.

DETAILED DESCRIPTION

As described above, there are challenges involved with tracking the timing of sending multicast copies of network packets for purposes of synchronization protocols. Although specific mention of multicasting is made herein, disclosed principles are applicable to any broadcasting to multiple recipients where synchronization protocols are involved. More specifically, when a first packet copy is transmitted will differ slightly from when a second packet copy is transmitted, both of which will differ significantly from when a $10^{th}$ or $20^{th}$ packet copy is transmitted. Thus, multiple packet copies in a multicast transmission will be sent and received at different times.

Differences in timing of sending packet copies in multicasting occur because hardware in a network interface device (such as a network adapter) is duplicating an original packet copy into the multicast packet copies, which are then transmitted to the subscribers (or receivers). As these devices do not include sufficient hardware to generate such packet copies simultaneously, the packet copies are generated serially, meaning transmitting and receiving the packet copies at slight intervals. As the speeds of network devices increase, the sensitivity to timestamp variation in synchronization also increases.

More specifically, a sender application (typically a software application) associated with a multicasting network interface device only receives one transmission (TX) timestamp despite the fact that the subscribers receive the packet copies at slight intervals. This sender application communicates the identical TX timestamp to all the subscribers, which subscribers therefore measure a variable one-way delay, e.g., a difference between the TX and receiving (RX) timestamps, depending on how the multicast duplication was performed. This leads to apparent synchronization quality degradation.

Aspects and embodiments of the present disclosure address these and other deficiencies by specifically determining receive (RX) timestamps to be sent to the subscribers as either the TX timestamp of the transmission to a first subscriber entity or the TX timestamp of this transmission plus a preset offset value of the transmission to an external subscriber. In various embodiments, the former approach functions best in multicast timestamping for systems in which subscriber entities to be synchronized are connected to the same network adapter, e.g., multiple hosts or virtual machines that share the same network adapter.

In related embodiments, the latter approach may function best when the first subscriber entity is the external subscriber to the system (e.g., which communicates via a different network adapter), and subsequent packet copies are transmitted to one or more subscriber entities that operate internally to the system that share the same network adapter. In this latter approach, the preset offset value may approximate an actual RX timestamp of the external subscriber. These various embodiments are possible because the network adapter is responsible for providing RX timestamps to the subscriber entities, and can be sent with a constant offset from the TX timestamp, as will be discussed in more detail, enabling proper synchronization relative to all subscriber entities by sending an identical RX timestamp to all subscribers.

Advantages of the present disclosure include but are not limited to improving the synchronization quality that is required by certain packet synchronization protocols, which in turn improves the quality of service (QoS) to multicasting subscribers. Other advantages will be apparent to those skilled in the art of multicasting by network adaptors and devices discussed hereinafter.

Figure 1:
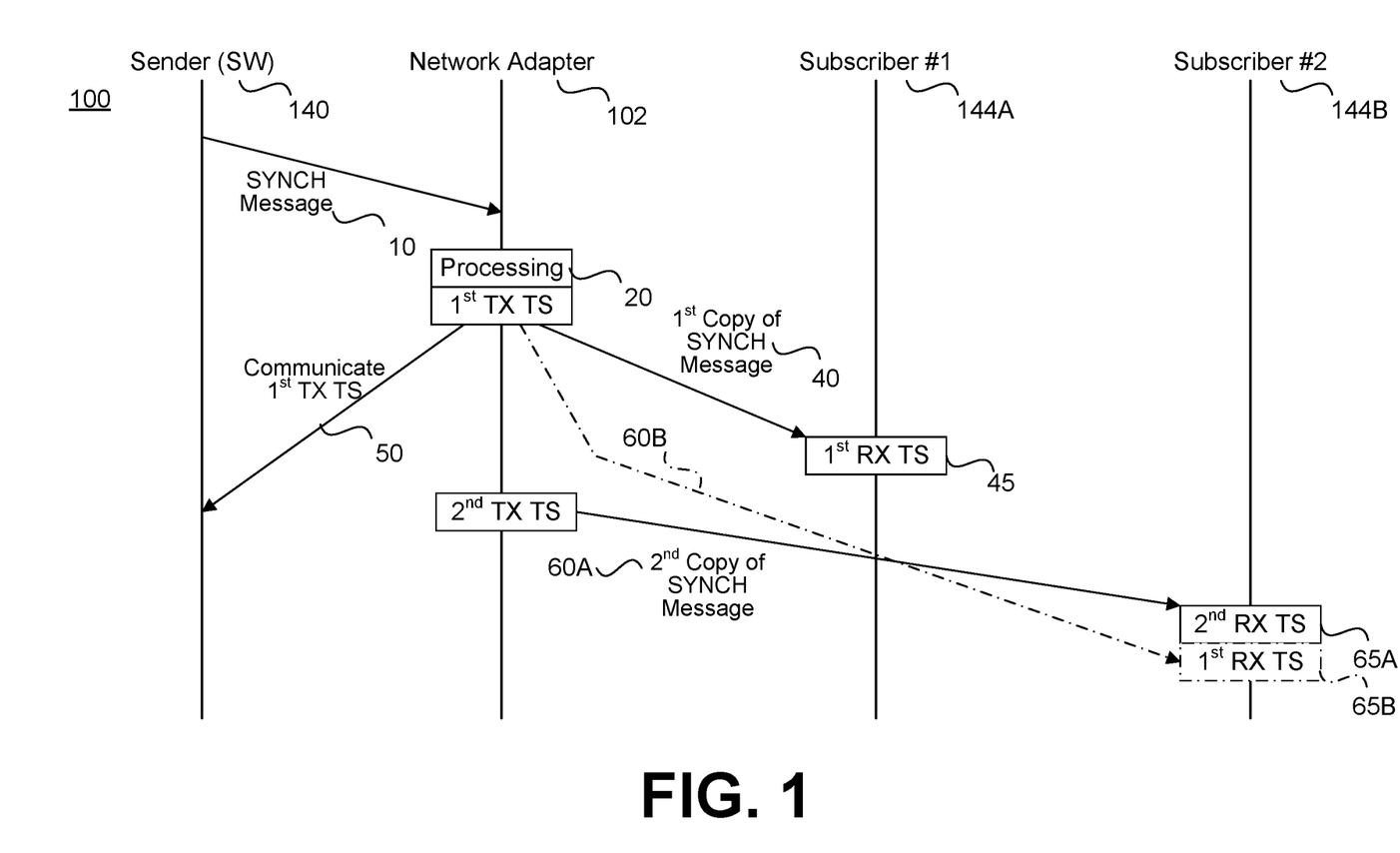
FIG. 1 is a network flow diagram involving a network adapter, in accordance with at least some embodiments.

FIG. 1 is a network flow diagram 100 involving a network adapter 102, in accordance with at least some embodiments. The network flow diagram 100 further involves a sender application 140, a first subscriber 144A, and a second subscriber 144B. Operations of the network flow diagram 100 need not be performed in a particular order unless explicitly described in that order. As illustrated, at operation 10, the network adapter 102 receives (or captures) a network packet from the sender application 140, which for purposes of this disclosure, is a software application running on a computing system in which the network adapter 102 is located. In at least some embodiments, the network adapter

102 receives the network packet within a synchronization (SYNCH) message that is prepared according to a particular packet synchronization protocol.

In some embodiments, at operation 20, the network adapter 102 processes the network packet, e.g., generates a first packet copy of the SYNCH message and begins transmitting the first packet copy, followed later by generating a second packet copy of the SYNCH message, and so forth depending on the number of subscribers. As part of multicasting, the network adapter 102 generates a first transmission (TX) timestamp, e.g., when, at operation 40, the first packet copy is transmitted to the first subscriber 144A. At operation 50, the network adapter 102 communicates the first TX timestamp to the sender application 140 for purposes of complying with the particular packet synchronization protocol.

In these embodiments, at operation 45, the first subscriber 144A adapts the first TX timestamp as a first RX timestamp when the first subscriber 144A receives the first packet copy. In embodiments, the first TX timestamp may operate as the first RX timestamp because the first subscriber 144A and the second subscriber 144B are coupled with the same network adapter. At operation 60A, the network adapter 102 transmits the second packet copy to the second subscriber 144B, generating a second TX timestamp that is also sent with the second packet copy (e.g., as a copy of the SYNCH message). At operation 65A, the second subscriber 144B adapts the second TX timestamp as a second RX timestamp when the second subscriber 144B receives the second packet copy.

As previously discussed, however, the first TX timestamp is the only TX timestamp received by the sender application 140, which is used for IP synchronization protocol calculations. As illustrated, the second TX timestamp is not captured and sent back to the sender application 140. As a result, while the first subscriber 144A may obtain reliable synchronization, the second subscriber 144B can measure a potentially irreducible timestamping (or clock) error and will report degraded synchronization quality.

By way of solution, in accordance with at least one embodiment, at operation 60B (in lieu of operation 60A), the network adapter transmits the second network copy to the second subscriber 144B with the first TX timestamp as well. Thus, at operation 65B (in lieu of operation 65A), the second subscriber 144B adapts the first TX timestamp as the RX timestamp used for purposes of packet synchronization protocol, thereby avoiding the timestamping (or clock) error.

Figure 2:
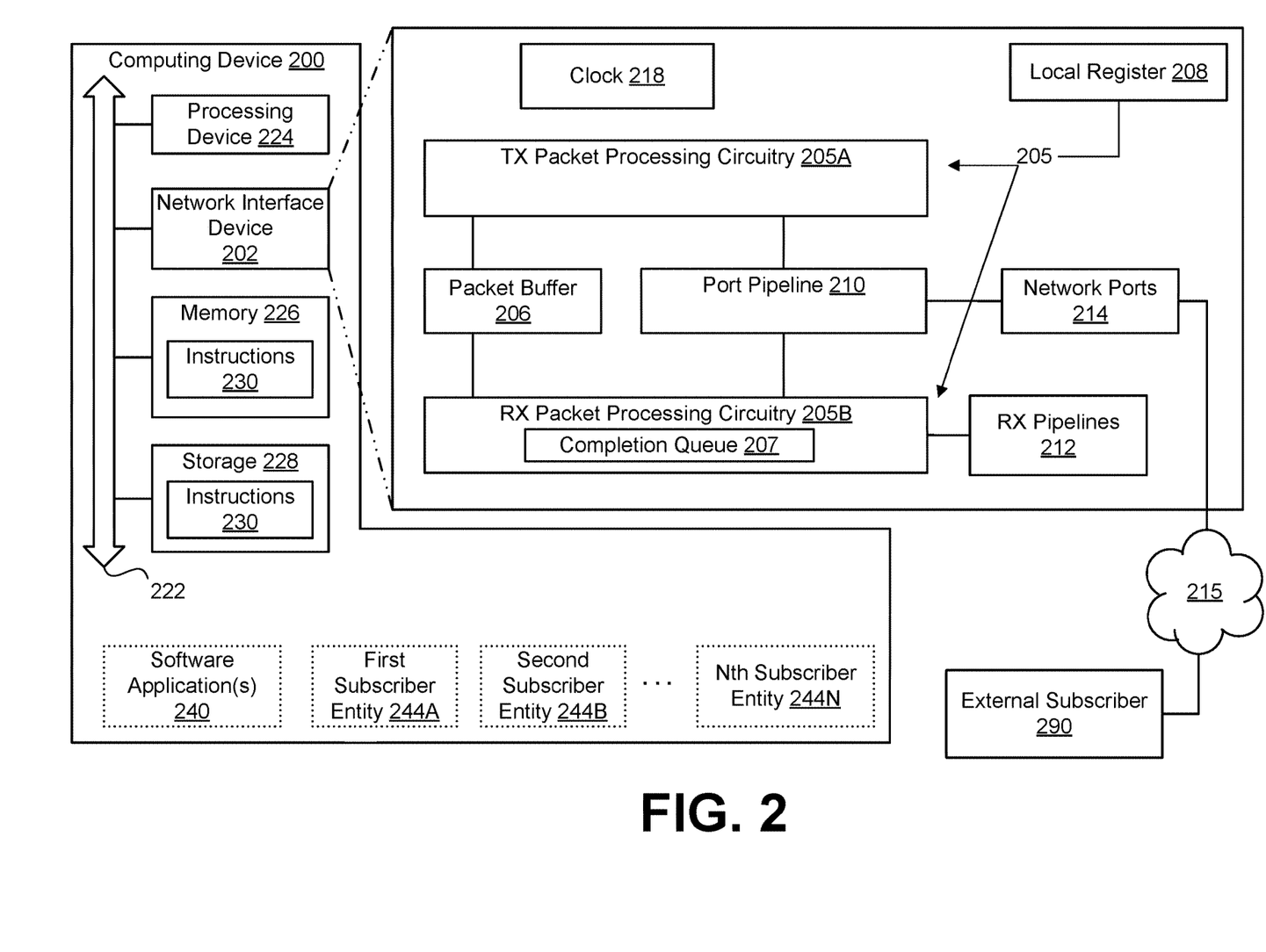
FIG. 2 is a block diagram of a computing device that includes a network interface device, in accordance with at least some embodiments.

FIG. 2 is a block diagram of a computing device 200 that includes a network interface device 202, in accordance with at least some embodiments. In at least some embodiments, the computing device 200 is a central processing unit (CPU), a graphics processing unit (GPU), or a data processing unit (DPU). In at least some embodiments, the network interface device 202 is an intelligent network interface card (NIC) or intelligent network adapter that includes, on-chip, significant processing capability including optionally having processor cores (not shown).

In various embodiments, the computing device 200 further includes a processing device 224, a memory 226 storing instructions 230, and a storage 228 storing the instructions 230. The instructions 230 stored in the memory may be a subset of the instructions 230 stored in the storage 228, e.g., sufficient to execute one or more software applications 240 currently running on the computing device 200. The memory 226 may be a main memory such as dynamic random access memory (DRAM) and/or static random access memory (SRAM) that the processing device 224 may use to run an operating system and the one or more software applications 240. The processing device 224 may include one or more processor cores and various levels of cache, for example.

In various embodiments, the processing device 224 also executes one or more operating systems (OSs) such as, in relation to multicast hosts, a first subscriber entity 244A, a second subscriber entity 244B, and an Nth subscriber entity 244N. In some embodiments, these subscriber entities are virtual machines, containers or shells, other OS instances, processors (e.g., multiple hosts), or processes each capable of representing a unique subscriber that is sharing the network interface device 202. In the disclosed embodiments, at least one external subscriber 290 communicates over a network 215 with the network interface device 202 in order to also host a multicast transmission from the computing device 200, as will be described in more detail. In some embodiments, the network 215 includes or is connected to the Internet.

In at least some embodiments, the network interface device 202 includes a local register 208, packet processing circuitry 205, a packet buffer 206, a port pipeline 210, a set of network ports 214, receive pipelines 212, and a clock 218, e.g., a physical clock internal to the network interface device 202. The packet buffer 206 may be configured to buffer packets that are generated by the one or more software applications 240, for example, which are intended to be multicasted. Each packet may be identified by a location within the packet buffer 206 and, therefore, retrievable using metadata that tracks the location within the packet buffer 206. In some embodiments, the local register 208 is either a hardware register or an entry in a reserved location within the memory 226 or other local memory, for example. The local register 208 may also include a database where multiple entries indexed within the database may store different timestamp values for different multicasting sessions.

In various embodiments, the packet processing circuitry 205 may include transmission (TX) packet processing circuitry 205A configured to package network packets that are to be supplied or transmitted to multiple subscribers during multicasting. The packet processing circuitry 205 may further include receive (RX) packet processing circuitry 205B configured to process packets received over the network 215, e.g., received via the network ports 214. Thus, the port pipeline 210 is coupled between the network ports 214 and both the TX packet processing circuitry 205A and the RX packet processing circuitry 205B. The RX packet processing circuitry 205B may further process and encapsulate packets to be inserted in one or more of the receive pipelines 212 associated with the subscriber entities 244A ... 244N, e.g., in a loop-back transmission of a network packet from the software application 240 to local subscribers, for example. For example, the RX packet processing circuitry 205B may generate, based on the clock 218, a receive timestamp for loop-back packets that are being sent by the software application 240 to one or more of the subscriber entities 244A ... 244N. In embodiments, the RX packet processing circuitry 205B includes a completion queue 207, which buffers entries of loop-back packets. In some embodiments, a receive timestamp is associated with a network packet being provided to a subscriber entity by storing the receive timestamp in a completion queue entry of the network packet.

In various embodiments, the RX processing circuitry 205 is made up of a hardware pipeline having a packet arbiter located late in that hardware pipeline that is employed to determine transmission (TX) and/or receive (RX) timestamps as discussed herein. In some embodiments, the packet processing circuitry 205 includes or is closely integrated with one or more programmable core(s) that perform at least a portion of the packet processing in order to steer the network packets from a particular source to a correct destination. Some of the contextual data from the programmable core(s) may then be provided to the hardware pipeline for purposes of the RX processing circuitry 205 performing particular actions that are determined through match-action tables stored in cache of the network interface device 224.

In these embodiments, the port pipeline 210 may coordinate timing and act on information within the processed network packet in order to route each TX network packet to a proper network port and each RX network packet appropriately to the RX packet processing circuitry 205B. The port pipeline 210 (or the packet arbiter of the TX packet processing circuitry 205A) may further generate a timestamp from the clock 218 upon transmission of a TX network packet out of one of the network ports 214. This timestamp may be a TX timestamp for that particular network packet. Additional functionality of the components of the computing device 200 will be discussed with reference to FIGS. 3-4.

Figure 3:
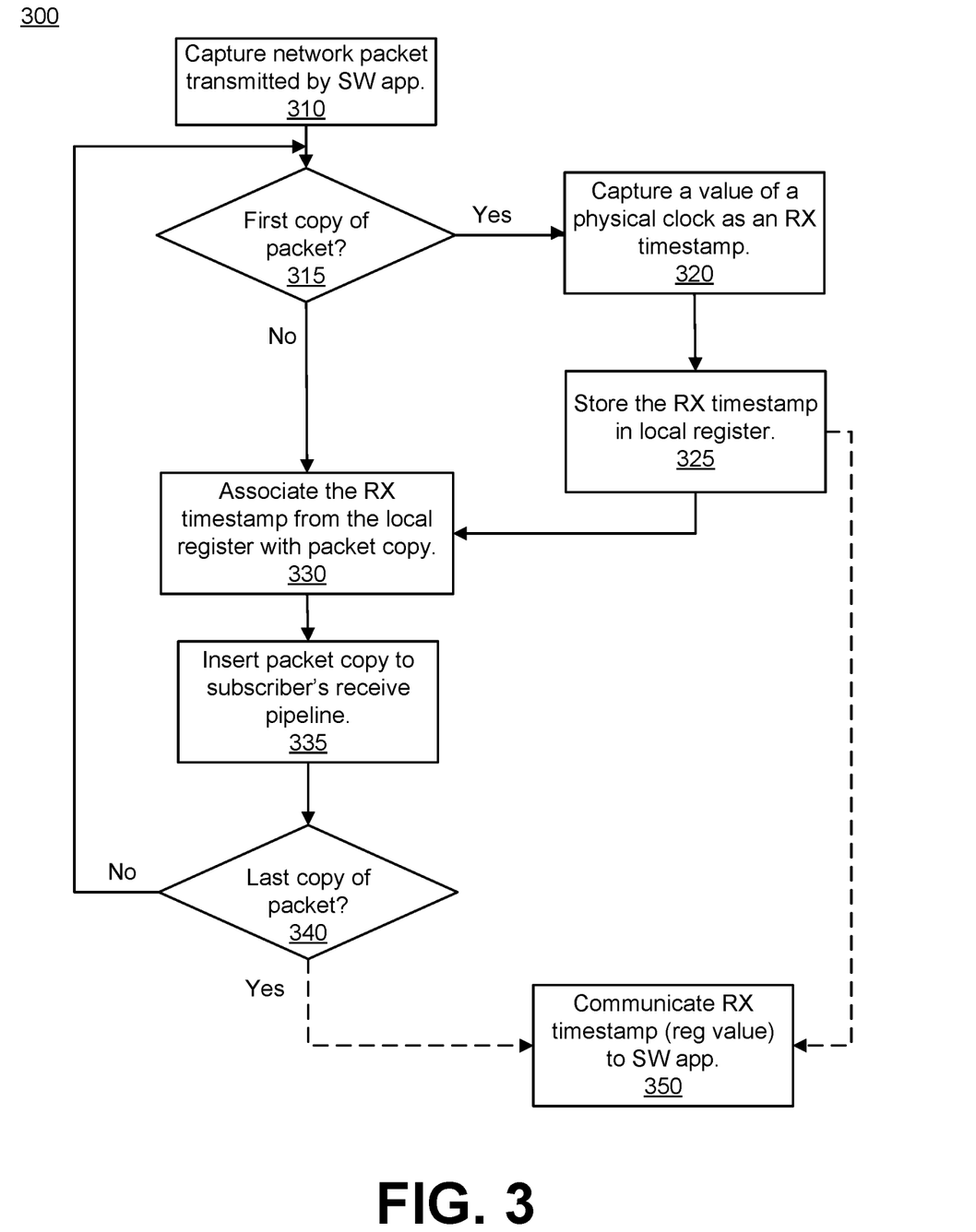
FIG. 3 is a flow diagram of a method for performing precise multicast timestamping to multiple subscribers within an integrated computing device or system, in accordance with at least some embodiments.

FIG. 3 is a flow diagram of a method 300 for performing precise multicast timestamping to multiple subscribers within an integrated computing device or system, in accordance with at least some embodiments. The method 300 can be performed by processing logic comprising hardware, software, firmware, or any combination thereof. In at least one embodiment, the method 300 is performed by the network interface device 202 of FIG. 2. For example, the packet processing circuitry 205 may be configured to operate with other components of the network interface device 202 to perform the operations of the method 300.

At operation 310, the processing logic captures a network packet transmitted by a software application 240 running on an integrated computing system such as the computing device 200 (FIG. 2). The network packet may be encapsulated within a SYNCH message that includes a multicast command, triggering the processing logic to cause copies of the network packet to be generated, one packet copy for each subscriber of the multicasting, as described herein below.

At operation 315, the processing logic determines whether the packet copy is a first packet copy. If it is, at operation 320, the processing logic captures, at time of transmission of the network packet, a value of a physical clock as a receive timestamp for subscriber entities that are running on the integrated computing system. At operation 325, the processing logic stores the receive timestamp in the local register 208.

At operation 330, the processing logic associates the receive (RX) timestamp from the local register 108 with a first packet copy of the network packet. For example, the processing logic can load the receive timestamp to the first packet copy or store the receive timestamp in a completion queue entry of the first packet copy, e.g., within the completion queue 207. At operation 335, the processing logic inserts the first packet copy to a first receive pipeline of the first subscriber entity 244A. For example, the first receive pipeline may be one of the receive pipelines 212 that has been assigned to the first subscriber entity 244A.

At operation 340, the processing logic determines whether the packet copy is the last packet copy of the network packet to be multicasted to all subscribers of the multicast transmission. If it is not, the method 300 loops back to operation 315 and, instead of flowing to operation 320, flows directly to operation 330 to generate an additional packet copy that includes the receive timestamp. For example, at operation 330, the processing logic associates the receive timestamp from the local register 208 with a second packet copy of the network packet. For example, the processing logic can load the receive timestamp to the second packet copy or store the receive timestamp in a completion queue entry of the second packet copy, e.g., within the completion queue 207. At operation 335, the processing logic inserts the second packet copy to a second receive pipeline of the second subscriber entity 244B. For example, the second receive pipeline may be one of the receive pipelines 212 that has been assigned to the second subscriber entity 244A.

In various embodiments, the packet buffer 206 is employed to store the network packet that is provided for transmission to the network interface device 202. In these embodiments, the packet processing circuitry 205 may further determine a buffer identifier (e.g., a slot number) that identifies a location of the network packet within the packet buffer 206. The packet processing circuitry 205 may further combine the buffer identifier with the receive timestamp to generate each of the first packet copy and the second packet copy.

As multicasting continues, the processing logic may determine at least a third subscriber entity is also subscribed to multicast copies of the network packet. Then, at operation 330, the processing logic associates the receive timestamp from the local register 208 with a third packet copy of the network packet. For example, the processing logic can load the receive timestamp to the third packet copy or store the receive timestamp in a completion queue entry of the third packet copy, e.g., within the completion queue 207. At operation 335, the processing logic inserts the third packet copy to a third receive pipeline of the third subscriber entity. For example, the third receive pipeline may be one of the receive pipelines 212 that has been assigned to the third subscriber entity of the receive pipelines 212. In these embodiments, each of the first subscriber entity 244A, the second subscriber entity 244B, and the third subscriber entity are subscribers to multicast copies of the network packet.

In at least some embodiments, sometime after operation 325 (when the receive timestamp is stored in the local register 208), at operation 350, the processing logic further communicates the receive timestamp stored in the local register 208 to the software application 240. This receive timestamp, for example, can match the TX timestamp for the first packet copy and be used by the software application 240 (the initiator of the multicasting) for purposes of packet synchronization protocol(s).

In at least one related embodiment, the receive timestamp loaded into each of the first packet copy and the second packet copy further includes a preset offset value, e.g., which may be a short time, such as several nanoseconds intended to approximate a value of the clock 218, after transmission of the network packet by the software application 240, when the first packet copy is inserted into the first receive pipeline. In this embodiment, before multicasting, the processing logic receives, from the software application 240, a synchronization message associated with the network packet. The processing logic may determine a transmission timestamp as a combination of the receive timestamp stored in the local register and the preset offset value and communicate the transmission timestamp to the software application 240, again, for purposes of packet synchronization protocol(s). In some embodiments, the preset offset value is a specific value depending on a type of the receive timestamp or the transmission timestamp for which the present offset value is compensating. For example, some timestamps may involve more or less delay and the preset offset value may change to compensate for differing delays.

In some embodiments, the processing logic further determines that no more packet copies of the network packet are to be generated, e.g., that the particular multicasting broadcast has concluded. Further, the processing logic can then remove the receive timestamp from the local register 208, which is freed up for a subsequent multicast session.

Figure 4:
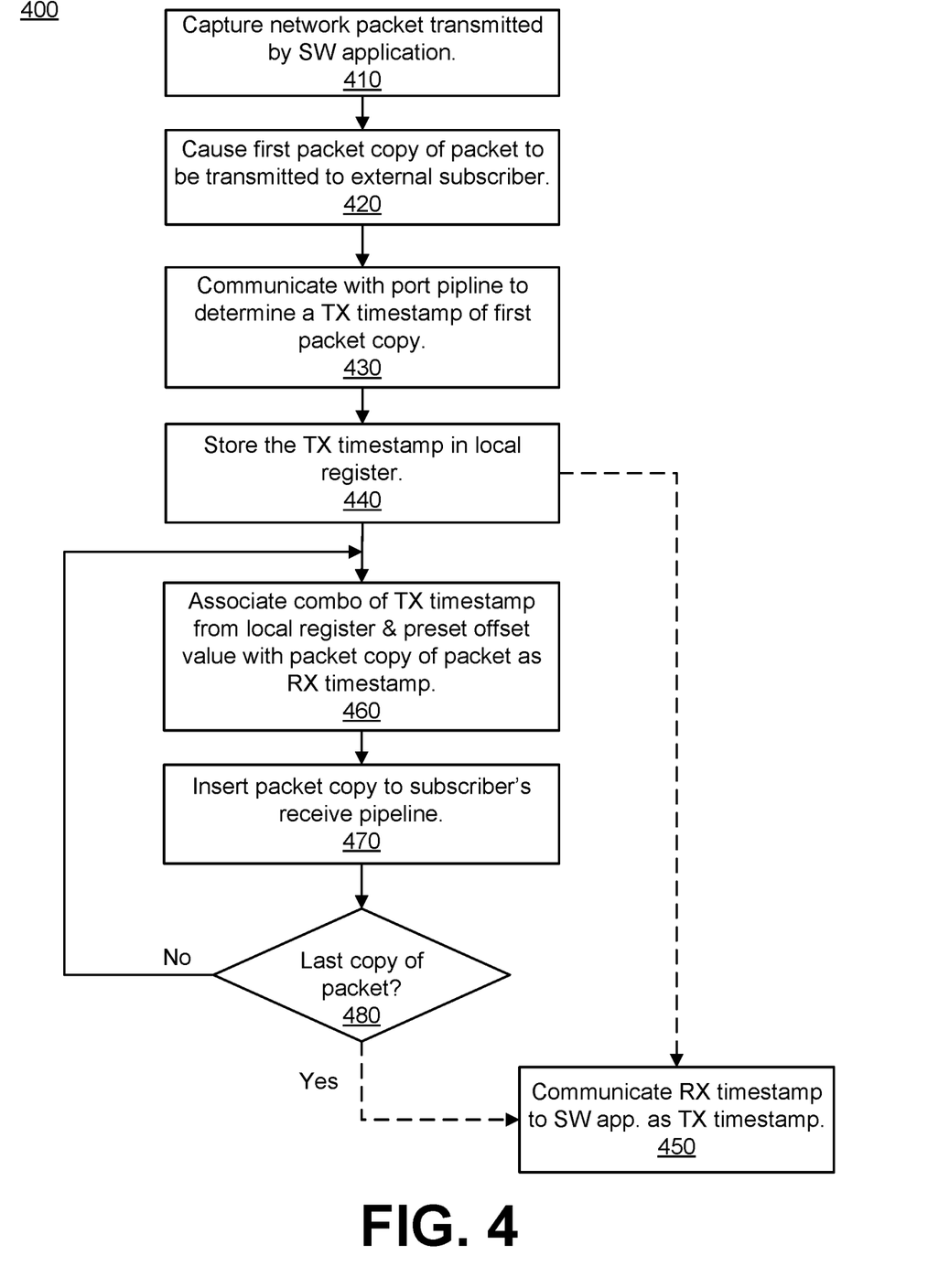
FIG. 4 is a flow diagram of a method for performing precise multicast timestamping, in accordance with at least some embodiments.

FIG. 4 is a flow diagram of a method 400 for performing precise multicast timestamping, in accordance with at least some embodiments. The method 400 can be performed by processing logic comprising hardware, software, firmware, or any combination thereof. In at least one embodiment, the method 400 is performed by the computing device 200 of FIG. 2. For example, the packet processing circuitry 205 may be configured to operate with other components of the network interface device 202 to perform the operations of the method 400.

At operation 410, the processing logic captures a network packet transmitted by a software application 240 running on an integrated computing system, e.g., the computing device 200 (FIG. 2). Thus, the software application 240 may be understood as the sender of a multicasted network packet. The network packet may be encapsulated within a SYNCH message that includes a multicast command, triggering the processing logic to cause copies of the network packet to be generated, one packet copy for each subscriber of the multicasting, as described herein below.

At operation 420, the processing logic causes a first packet copy of the network packet to be transmitted to the external subscriber 290 via a port pipeline of the network interface device. In at least this embodiment, the processing logic includes or has access to multicast steering tables that are configured as match-action tables to determine how to process the packet for the first packet copy to be sent to the external subscriber 290.

At operation 430, the processing logic communicates with the port pipeline 210 to determine a transmission timestamp for the first packet copy. To obtain this transmission timestamp, the processing logic may communicate with the physical layer of the network 215 to obtain the precise transmission timestamp when the first packet copies were transmitted.

At operation 440, the processing logic stores the transmission timestamp in the local register 208.

At operation 450, the processing logic associates a combination of the transmission timestamp from the local register 208 and a preset offset value with a second packet copy of the network packet as a receive timestamp. The preset offset value may be a value determined as an estimated or measured delay between the transmission timestamp and a time of the clock 218 at which the external participant 290 receives the first packet copy. In various embodiments, this associating may include loading the combination of the transmission timestamp and the preset offset value to the second packet copy or storing the combination of the transmission timestamp and the preset offset value in a completion queue entry of the second packet copy, e.g., in the completion queue 207.

At operation 470, the processing logic inserts the second packet copy to a receive pipeline of a subscriber entity. For example, the receive pipeline may be one of the receive pipelines 212 that has been assigned to a subscriber entity, such as the first subscriber entity 244A. The subscriber entity may be a virtual machine operating on a computing device that includes the network interface device. In these embodiments, each of the external subscriber and the subscriber entity is a subscriber to multicast copies of the network packet.

In at least some embodiments, in association with operations 460 and 470, the processing logic determines a buffer identifier identifying a location of the network packet that is stored within the packet buffer 206. The processing logic may further combine the buffer identifier with the transmission timestamp to generate the second packet copy and also additional packet copies to be multicasted.

At operation 480, the processing logic determines whether the second packet copy is the last packet copy or if the multicast includes additional subscribers to which to transmit additional packet copies. If this is not the last packet copy, the method 400 loops back to operation 460 and continues transmitting additional packet copies. For example, the processing logic may determine at least a second subscriber entity is also subscribed to multicast copies of the network packet, associate the receive timestamp with a third packet copy of the network packet, and insert the third packet copy to a second receive pipeline of the second subscriber entity. The receive timestamp, as before, may be a combination of the transmission timestamp from the local register 208 and the preset value.

If this is the last packet copy at operation 480, operation 450 is performed if it has not yet been performed before operation 480. More specifically, in at least some embodiments, sometime after operation of 440 (when the receive timestamp is stored in the local register 208), at operation 450, the processing logic further communicates the receive timestamp to the software application 240 as the transmission timestamp. For example, the receive timestamp is a combination of the transmission timestamp stored in the local register 208 and the preset offset value. In embodiments, the preset offset value is a specific value depending on a type of the transmission timestamp. For example, some timestamps may involve more or less delay and the preset offset value may change to compensate for differing delays. In this way, the software application 240 may treat the receive timestamp as the TX timestamp for purposes of any packet synchronization protocol. In at least some embodiments, the processing logic receives, from the software application 240, a synchronization message associated with the network packet and communicates the combination of the transmission timestamp and the preset offset value to the software application 240.

In some embodiments, the processing logic further determines that no more packet copies of the network packet are to be generated, e.g., that the particular multicasting broadcast has concluded. Further, the processing logic can then remove the receive timestamp from the local register 208, which is freed up for a subsequent multicast session.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range, unless otherwise indicated herein, and each separate value is incorporated into the specification as if it were individually recited herein. In at least one embodiment, the use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in an illustrative example of a set having three members, conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. In at least one embodiment, a set of non-transitory computer-readable storage media comprises multiple non-transitory computer-readable storage media and one or more of individual non-transitory storage media of multiple non-transitory computer-readable storage media lack all of the code while multiple non-transitory computer-readable storage media collectively store all of the code. In at least one embodiment, executable instructions are executed such that different instructions are executed by different processors.

Accordingly, in at least one embodiment, computer systems are configured to implement one or more services that singly or collectively perform operations of processes described herein and such computer systems are configured with applicable hardware and/or software that enable the performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transform that electronic data into other electronic data that may be stored in registers and/or memory. As non-limiting examples, a "processor" may be a network device, a NIC, or an accelerator. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as the system may embody one or more methods and methods may be considered a system.

In the present document, references may be made to obtaining, acquiring, receiving, or inputting analog or digital data into a subsystem, computer system, or computer-implemented machine. In at least one embodiment, the process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or inter-process communication mechanism.

Although descriptions herein set forth example embodiments of described techniques, other architectures may be used to implement described functionality, and are intended to be within the scope of this disclosure. Furthermore, although specific distributions of responsibilities may be defined above for purposes of description, various functions and responsibilities might be distributed and divided in different ways, depending on circumstances.

Furthermore, although the subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A network interface device comprising:
   a local register; and
   packet processing circuitry coupled to the local register, the packet processing circuitry to:
   capture a network packet transmitted by a software application running on an integrated computing system;
   capture, at time of transmission of the network packet, a value of a physical clock as a receive timestamp for subscriber entities that are running on the integrated computing system;
   store the receive timestamp in the local register;
   associate the receive timestamp from the local register with a first packet copy of the network packet;
   insert the first packet copy to a first receive pipeline of a first subscriber entity;
   associate the receive timestamp from the local register with a second packet copy of the network packet; and
   insert the second packet copy to a second receive pipeline of a second subscriber entity.

2. The network interface device of claim 1, wherein each of the first subscriber entity and the second subscriber entity is a subscriber to multicast copies of the network packet.

3. The network interface device of claim 1, wherein to associate the receive timestamp, the packet processing circuitry is to load the receive timestamp to the first packet copy and to the second packet copy.

4. The network interface device of claim 1, wherein to associate the receive timestamp, the packet processing circuitry is to store the receive timestamp in a completion queue entry of the first packet copy and the second packet copy.

5. The network interface device of claim 1, wherein at least one of the first subscriber entity or the second subscriber entity is one of a virtual machine, a container, a processor, or a process.

6. The network interface device of claim 1, wherein the local register is one of a hardware register or an entry in a local memory.

7. The network interface device of claim 1, wherein the receive timestamp associated with each of the first packet copy and the second packet copy further includes a preset offset value, and wherein the packet processing circuitry is further to:
   receive, from the software application, a synchronization message associated with the network packet;
   determine a transmission timestamp as a combination of the receive timestamp stored in the local register and the preset offset value; and
   communicate the transmission timestamp to the software application.

8. The network interface device of claim 7, wherein the preset offset value comprises a specific value depending on a type of the receive timestamp.

9. The network interface device of claim 1, further comprising a packet buffer coupled to the packet processing circuitry, the packet buffer to store the network packet, wherein the packet processing circuitry is further to:
   determine a buffer identifier identifying a location of the network packet within the packet buffer; and
   combine the buffer identifier with the receive timestamp to generate each of the first packet copy and the second packet copy.

10. The network interface device of claim 1, wherein the packet processing circuitry is further to:
    determine at least a third subscriber entity is also subscribed to multicast copies of the network packet;
    associate the receive timestamp from the local register with a third packet copy of the network packet; and
    insert the third packet copy to a third receive pipeline of the third subscriber entity.

11. The network interface device of claim 1, wherein the packet processing circuitry is further to:
    determine that no more packet copies of the network packet are to be generated; and
    remove the receive timestamp from the local register.

12. A method comprising:
    capturing, by a network interface device, a network packet transmitted by a software application running on an integrated computing system;
    causing a first packet copy of the network packet to be transmitted to an external subscriber via a port pipeline of the network interface device;
    communicating with the port pipeline to determine a transmission timestamp for the first packet copy;
    storing the transmission timestamp in a local register;
    associating a combination of the transmission timestamp from the local register and a preset offset value with a second packet copy of the network packet as a receive timestamp; and inserting, by the network interface device, the second packet copy to a receive pipeline of a subscriber entity.

13. The method of claim 12, wherein each of the external subscriber and the subscriber entity is a subscriber to multicast copies of the network packet.

14. The method of claim 12, wherein associating comprises loading the combination of the transmission timestamp and the preset offset value to the second packet copy.

15. The method of claim 12, wherein associating comprises storing the combination of the transmission timestamp and the preset offset value in a completion queue entry of the second packet copy.

16. The method of claim 12, wherein the subscriber entity is one of a virtual machine, a container, a processor, or a process operating on a computing device that includes the network interface device.

17. The method of claim 12, further comprising:
receiving, from a software application, a synchronization message associated with the network packet; and
communicating the combination of the transmission timestamp and the preset offset value to the software application.

18. The method of claim 12, further comprising:
determining a buffer identifier identifying a location of the network packet that is stored within a packet buffer; and
combining the buffer identifier with the transmission timestamp to generate the second packet copy.

19. The method of claim 12, further comprising:
determining at least a second subscriber entity is also subscribed to multicast copies of the network packet;
associating the receive timestamp with a third packet copy of the network packet; and
inserting the third packet copy to a second receive pipeline of the second subscriber entity.

20. The method of claim 12, further comprising:
determining that no more packet copies of the network packet are to be generated; and
removing the transmission timestamp from the local register.

21. The method of claim 12, wherein the preset offset value comprises a specific value depending on a type of the transmission timestamp.

22. A system comprising:
a computing device to run at least a first subscriber entity and a second subscriber entity; and
a network interface device integrated with the computing device, the network interface device comprising:
a local register; and
packet processing circuitry coupled to the local register, the packet processing circuitry to:
capture a network packet transmitted by a software application running on the computing device;
capture, at time of transmission of the network packet, a value of a physical clock as a receive timestamp for the first subscriber entity and the second subscriber entity;
store the receive timestamp in the local register;
associate the receive timestamp from the local register with a first packet copy of the network packet;
insert the first packet copy to a first receive pipeline of the first subscriber entity;
associate the receive timestamp from the local register with a second packet copy of the network packet; and
insert the second packet copy to a second receive pipeline of the second subscriber entity.

* * * * *